United States Patent [19]
Adams

[11] 3,952,620
[45] Apr. 27, 1976

[54] SMALL COMPONENT SAWING ASSEMBLY
[76] Inventor: James D. Adams, Box 7462, Colorado Springs, Colo. 80933
[22] Filed: May 16, 1974
[21] Appl. No.: 470,625

[52] U.S. Cl. ................................. 83/422; 83/423; 83/432; 83/433; 83/435
[51] Int. Cl.² .................. B23D 45/14; B26D 3/02; B27B 5/04
[58] Field of Search ............ 83/3, 422, 423, 425.2, 83/432, 433, 435, 435.2, 473, 477.1, 581

[56] References Cited
UNITED STATES PATENTS

| 553,009 | 1/1896 | Luther | 83/425.2 |
| 2,690,804 | 10/1954 | Erlert | 83/433 X |
| 3,229,732 | 1/1966 | Mayo | 83/435.2 X |
| 3,538,963 | 11/1970 | Adams | 83/473 X |
| 3,757,625 | 9/1973 | Pfenning | 83/432 X |

Primary Examiner—J. M. Meister
Assistant Examiner—Fred A. Silverberg
Attorney, Agent, or Firm—Richard D. Law

[57] ABSTRACT

A multiple saw assembly, for cutting small lumber components from longer lumber, having a pair of opposed saws, for forming component end angles, each mounted on a double pivot mounting to provide optimum saw engagement with lumber at various angles of cut. Lumber feed and hold down means provide uniform components for various widths of the components and various lengths of feed stock.

6 Claims, 6 Drawing Figures

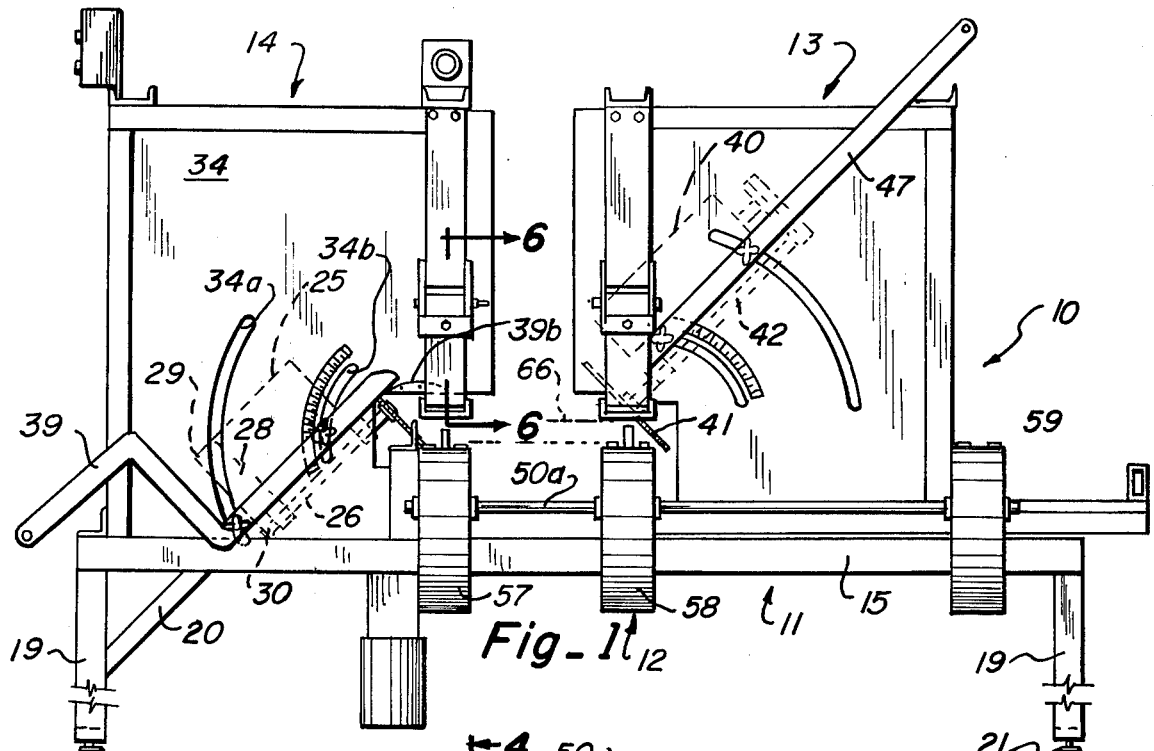
Fig_1
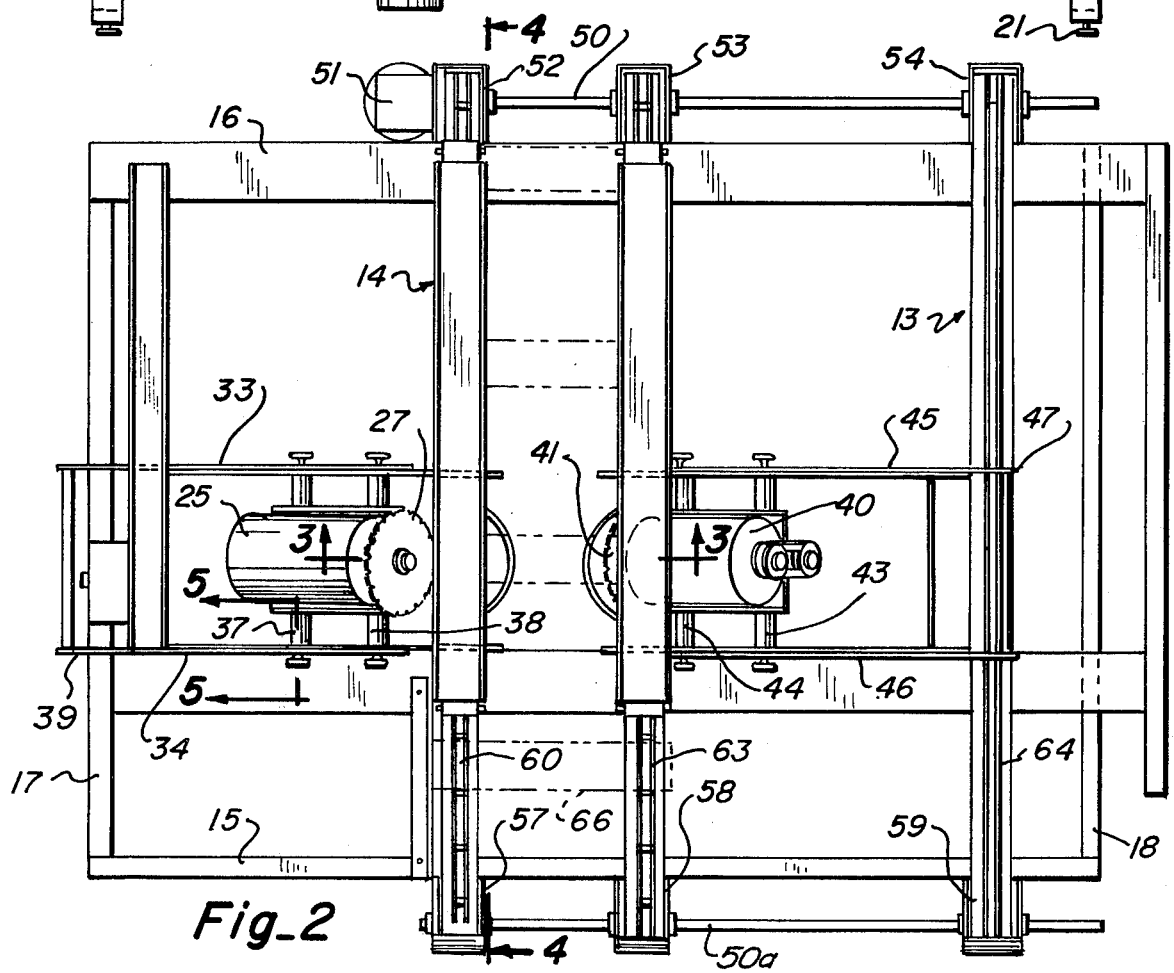
Fig_2

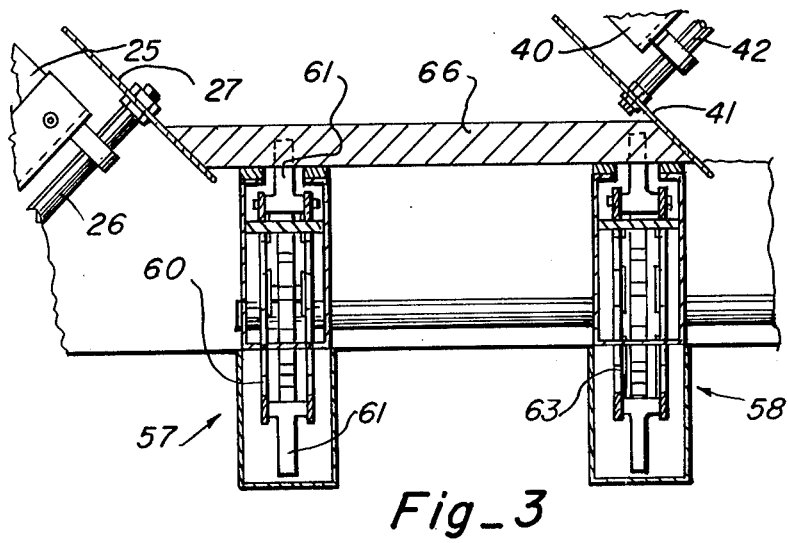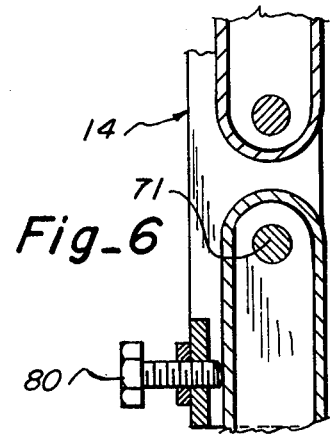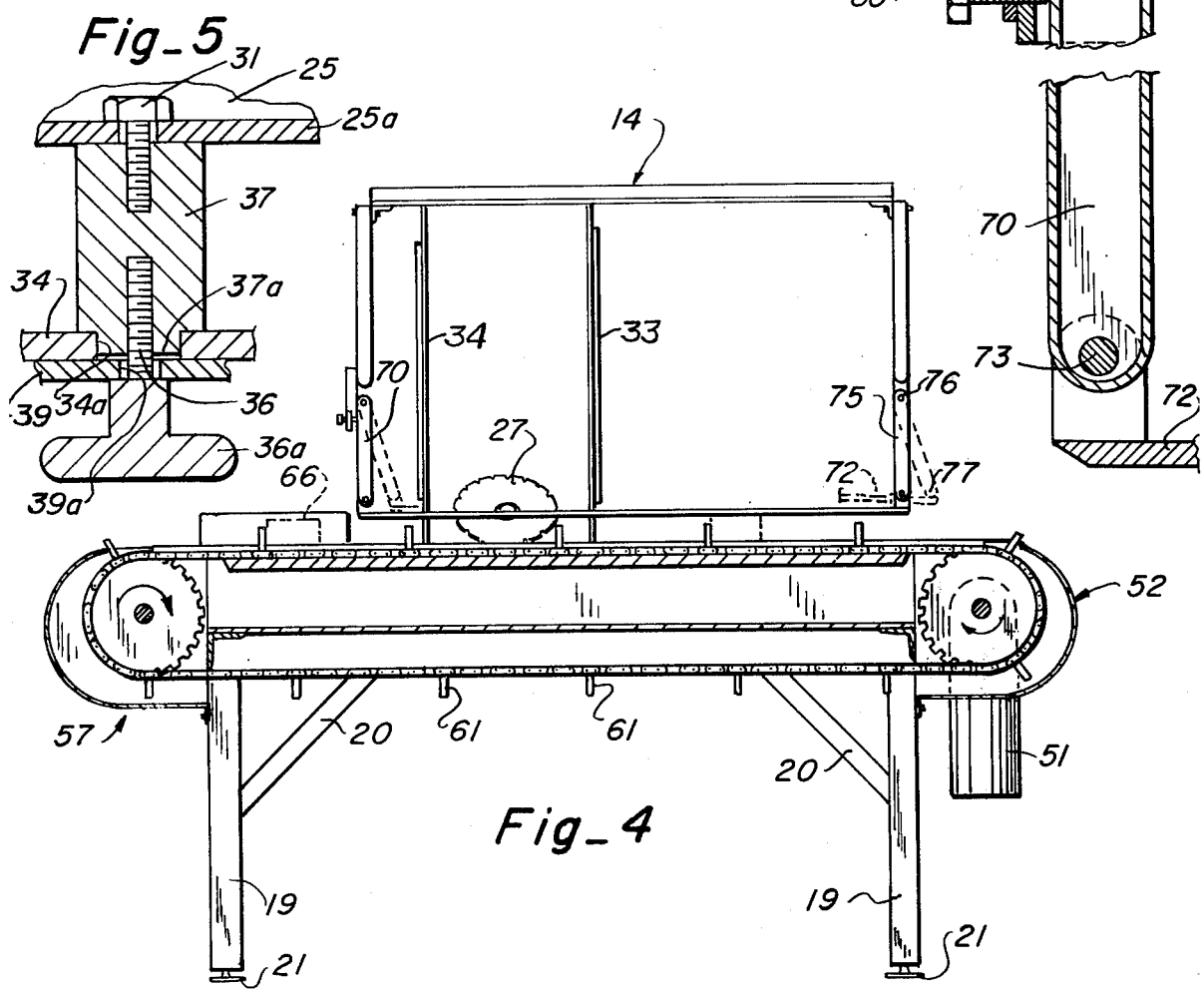

SMALL COMPONENT SAWING ASSEMBLY

As building techniques have changed and labor costs have soared, numerous types of prefabricated components for buildings have been devised to meet such changes and lower costs of construction. For example, roof trusses a number of years ago were made in place on the building walls, but recently many roof trusses are prefabricated at a component plant and the manufactured, complete trusses are transported to the in-progress building for setting on the walls. Other examples of this type of building components includes wall panels, roof gable panels, pre-hung doors and windows, etc. These components, being made under controlled conditions at a manufacturing facility, are of a uniform size and quality, are usually stronger than made-in-place components and are generally less expensive when installed. Certainly, the expense of installation of the prefabricated components is less than the in-place made components.

Recently floor joists have been prefabricated at a manufacturing facility and then transported to the job. These are truss-like joists, generally in a width of 8 to 14 inches and of various lengths. The truss-like joists have upper and lower stringers of the necessary length and a plurality of diagonal cross bracing to provide necessary strength of the stringers. The open truss work permits pipes, conduits, and the like to be extended through the joists leaving flat top and bottom surfaces of the joists without hanging appendages. These joists are formed, usually of 2 × 4 inches or equivalent stock, with the major lateral dimension of the stock in the horizontal position. This provides a joist having a broad surface for nailing flooring and ceiling material to the joists, rather than the narrowest dimension as with conventional 2 inch stock set vertically on supporting walls and spanning the distance between the vertical supports.

In the manufacture of the prefabricated floor joists, dimensional accuracy of the diagonal bracing is highly important. Particularly is the length and the angle of the cut ends critical to produce properly shaped and uniformly sized joists. Due to the rather short lengths of the cross members used in manufacturing of such floor joists, particularly the diagonal bracing, production of such members of the joists is difficult, even with existing component forming multiple saws. For example, such a multiple saw is shown in my U.S. Pat. No. 3,538,963. While such multiple saws have been very satisfactory for producing longer length members, the different and difficult problems of producing the short length members have not permitted effective use of such multiple saws, particularly since such multiple saw assemblies use moving saws, making the production of very short members very difficult.

According to the present invention a pair of variable angle stationary saws are fed lumber stock by a conveyor. The stock is accurately held in position for the pair of saws, and the ends of the stock are cut at the desired angle. The component is accurately cut to the desired length by the stationary saws. The finished components are continuously moved from the saws and from the machine. The waste or other length of the feed stock is likewise continued past the saw and discarded from the machine. The lumber stock is fed by a pair of coordinated chain conveyors and it is accurately held in position on the conveyors by means of a hold-down which permits minor variations in the thickness of the feed stock. Each of the saws of the assembly is mounted by a pair of lateral supports in a pair of arcuate slots in a support plate which permits the angle of the saw to be varied about an imaginary point beyond the shaft of the saw permitting optimum contact of the saw blade with the lumber feed stock. The arrangement provides for maximum use of the feed stock and permits variations of the end angles of cuts from parallel angle cuts to diverging or converging cuts.

Included among the objects and advantages of the present invention is to provide a multiple saw assembly for forming short length lumber components.

Another object of the invention is to provide a multiple saw assembly utilizing variable angle stationary saws to produce short length lumber components.

Yet another object of the invention is to provide a multiple saw assembly having a conveyor feed for lumber stock and a lumber hold-down permitting the use of variable thickness of lumber.

An additional object of the invention is to provide a multiple saw assembly having a pair of saws each of which is easily adjustable to the desired angle of saw cut, automatically setting optimum contact of the saws with the feed stock at the desired angle.

These and other objects and advantages of the invention may be readily ascertained by referring to the description and appended illustrations in which:

FIG. 1 is a front elevational view of the sawing assembly according to the present invention;

FIG. 2 is a top plan view of the sawing assembly shown in FIG. 1, and shows the pair of saws positioned on each side of the component feed conveyor;

FIG. 3 is a partial detailed sectional view of the saws and feed mechanism of the device of FIG. 2, and shows the relationship of the saws with respect to the component conveyor;

FIG. 4 is a sectional view taken along the lines 4—4 of FIG. 2 and shows the overall arrangement of one portion of the conveyor;

FIG. 5 is an enlarged detail view of a saw mounting adjustment member, taken along lines 5—5 of FIG. 2; and FIG. 6 is an enlarged sectional view of a lumber hold-down taken along the line 6—6 of FIG. 1.

Specifically in the drawings, FIG. 1 shows a small component sawing assembly, shown by numeral 10, including a support framework, shown by numeral 11, component conveyor, shown by numeral 12, and lateral saw mounting frameworks, shown by numerals 13 and 14.

The base support framework 11 includes base peripheral members 15, 16 and side members 17, 18 joined together as by welding or the like to form a rectangular base structure mounted on downwardly extending legs 19 arranged at the corners of the base. Diagonal braces 20 are positioned between the legs 19 and the lateral members 15, 16 and side members 17, 18 to form a rigid base support structure. If desired, screw-type leg caps 21 can be provided in each leg to level the overall structure.

The saws of the device are electric motor operated, and preferably are belt driven, such as shown in FIG. 1. In some cases it may be advantageous to provide direct motor driven saw, that is, the saw mounted on the shaft of the motor. As shown in FIG. 1, the left hand motor 25 is mounted on a frame with the shaft 26 on the same frame and on which is mounted a saw 27. The shaft 26 is rotated by a belt 28 reeved over a pulley 29 on the motor and a pulley 30 on the shaft 26. The frame of left motor 25 is mounted on a pair of spaced apart walls 33 and 34, each wall of which includes a pair of spaced apart arcuate slots, for example, wall 34 includes slots 34a and 34b. The wall 33 has similar slots, not shown, which slots are in register with the slots in the wall 34. The motor 25 is provided with rear motor mounts 37 and front motor mounts 38 which extend outwardly from either side of the motor 25. The rear mount 37 provides a boss 37a, as shown in FIG. 5, riding in slot 34a in the wall 34. A lock screw 36 with a handle 36a provides means for securing the mount 37 to the wall 34. The handle 39 including apertures 39a permit the lock screw 36 to pass therethrough and be locked into position in the slot as well as the motor 25 on the mount 37. The handle permits easy positioning of the saw. The motor 25 includes a motor mount frame 25a which is attached by means of a bolt 31 to the mount 37. The two ends of the rear motor mount 37 are releasably attached in the same manner to the walls 33 and 34, and the front mounts 38, in a like manner, are releasably mounted in the slots in the walls 33 and 34. In a similar manner, the opposed motor 40 and saw arrangement is likewise mounted. In this case, a motor 40 having a saw 41 mounted on a shaft 42 is mounted by means 43 and 44 to the walls 45 and 46. In this case the motor mounts are mounted through the handle 47 to the wall. Both handle 39 and 47 permit means for changing the position of the motors and saw arrangements.

Mounted on the base frame is a component conveyor system which includes a shaft 50 rotated by a gear motor 51. Mounted on the rear shaft 50 is a generally stationary bearing and sprocket set 52, a movable bearing and sprocket set 53 and another movable bearing and sprocket set 54. On the opposite side of the base from the bearing set 52 is another stationary bearing and sprocket set 57 which is in register with the set 52. A movable bearing and sprocket set 58 is mounted on the side with set 57 in register with set 53, and a second movable bearing set 59 with attached sprocket is mounted on the front shaft 50a, which is the same type of shaft. A chain 60, shown in FIG. 4, with a plurality of upstanding lugs 61 is arranged as a lumber conveyor mounted around the sprockets of sets 52 and 57. This provides an endless lumber conveyor using the upstanding lugs 61 to move the lumber through the saws. In a similar manner, chain 63 is reeved around the sprockets of bearing sets 53 and 58, and it also contains upstanding lugs which are in alignment with the lugs of chain 60. In a similar manner, a chain 64 is mounted on the sprockets of bearing sets 54 and 59 and it, likewise, contains upstanding lugs which are aligned with the lugs of chains 60 and 63 so that a length of lumber, as shown in phantom 66 in FIG. 4, is moved perpendicularly to the saws and is deposited to the rear of the machine.

As explained above, the bearing and sprocket sets for chains 63 and 64 are mounted on the saw support 13 which is movable across the base. The sprocket and bearing sets 53 and 54 are movable along the shaft 50, and means are provided for securing the sprocket to the shaft in any position so that the chains 63 and 64 move conjointly with the upstanding lugs on the chains moving the lumber perpendicularly through the unit for accurate sawing. With the movable frame section 13 the length of the lumber may obviously be varied, and the angular movement of each motor and saw mount provides different angles of cuts by each saw.

As lumber thickness varies somewhat, a variable thickness hold-down mechanism is provided to insure that the lumber passing through the saws is maintained in tight contact with the chain conveyors and through the saws. As shown in FIGS. 4 and 6, the lumber hold-down means includes a pivoted link-arm 70 pivoted by means of the pivot 71 to the saw frame, the frame 14, for example; however, the lumber hold-down mechanism is mounted on each of the saw frames adjacent the saws for holding the lumber for both saws, and description of one is sufficient for both. Pivoted to the bottom of the arm 70 is a lumber hold-down shoe 72 pivotally mounted by means of pivot 73 to the arm 70. The front pivot arm 70 is secured to rear pivot arms 75 by means of the elongated shoe 72, and it, likewise, is pivoted by means of pivot 76 to frame 14 and by pivot 77 to the shoe 72. A thumb screw 80 is mounted on the wall 14 provides means for adjusting the vertical alignment of the arm 70. This provides means for an additional adjustment for the height of the shoe accommodating the lumber to be passed through the assembly. As lumber initially contacts the shoe 72 it slides under the shoe, and the weight of the shoe assembly holds the lumber down onto the chains and in position for sawing by the pair of saws. When the thickness of the lumber member passing through is slightly larger than the set width, the hold-down will swing rearwardly and upwardly permitting the lumber to pass under the shoe but still holding the lumber against the chains for the sawing.

By providing the saw mounts with a pair of spaced apart supports secured in arcuate slots as shown in FIG. 1, the saw may be moved to any desired angle, from a vertical angle to about a 45° undercut angle and to about an overcut angle of about 45°, which gives at least about a 90° swing of the saw. The inner end of the handle 39 rests against a stop 39b which supports the front end of the motor during pivotal movement and holds the saw blade in position to provide optimum cut of any lumber passing therethrough. A similar arcuate stop is provided on the rear wall 45 for the handle 47. These arcuate stops permit the handles to be raised and lowered while maintaining the saw in its optimum position for sawing lumber passing therethrough and insuring that the saw passes completely through the lumber.

The arrangement of the saw supports permit the small lumber components to be provided with square end cuts in sizes from about 6 inches long on up to about 18 to 20 inches or the like. Further, the saws may be positioned to provide parallel angle cuts on the lumber or to provide diverging or converging cuts on opposite ends of the components. By passing a component through the saws to form an angle at each end thereof, a compound angle may be formed by passing that same piece back through the saws set at a different angle and thereby provide a compound cut, the point of which is exactly along the center line of the piece of lumber.

The chain conveyors provide means for accurately moving lumber through the pair of saws so that the lumber remains exactly perpendicular to the saw faces, while the waste end is carried away by chain 64. After cutting the lumber passes along the conveyor and is discharged over the bearing sets 52 and 53 into a uniform pile.

I claim:

1. A small component sawing assembly comprising a. base means including upstanding legs;
b. stationary saw mount means depending from one side of said base means including a pair of walls each having a pair of spaced apart registered arcuate slots, and a saw assembly having forward and rear mounts arcuately moveable at a variable angle in said slots providing a pair of spaced apart opposed motor mounting means for the saw providing optimum contact between said saw and lumber being cut,
c. a laterally movable saw mount means mounted on said base means moving toward and away from said stationary mount including a pair of walls each having a pair of spaced apart registered arcuate slots, and a saw assembly having forward and rear mounts pivotally mounted at a variable angle in said slots providing a pair of spaced apart opposed motor mounting means utilizing a variable pivot point for the saw providing optimum contact between said saw and lumber being cut;
d. a first endless conveyor assembly including lumber hooks mounted closely adjacent said stationary saw mount;
e. a second endless conveyor assembly including lumber hooks mounted closely adjacent to and movable with said movable saw mount means;
f. means for conjointly rotating said conveyors for moving lumber through said saws; and
g. variable lumber hold-down means including a pair of elongated, horizontally disposed shoe means positioned above and parallel with said first conveyor assembly, and elongated, horizontally disposed shoe means positioned above and parallel with said second conveyor assemblys, and each including upwardly extending pivoted links on each end of each said shoe means providing pivot mounting means for each said shoe means permitting each shoe means to swing rearwardly and upwardly holding lumber on said conveyor means.

2. A small component saw assembly according to claim 1 wherein U-shaped handle means is secured to each said opposed mount for movement of rear and forward mounts in their respective slots pivoting the forward and rear portion of each said saw assembly.

3. A small component saw assembly according to claim 1 being further characterized by a third conveyor assembly on said base at the outside edge of said second saw assembly remote from said second conveyor assembly movable conjointly with said second conveyor assembly and conjointly rotatable therewith.

4. A small component saw assembly according to claim 1 wherein each said saw assembly includes an electric motor mounted on frame means, a shaft remote from and parallel with the shaft of said motor, a saw blade mounted on said shaft, and belt drive means between the motor shaft and the saw shaft for rotating said saw blades.

5. A small component saw assembly according to claim 1 wherein each said saw assembly is mounted with handle means for varying the angle of cut of the saw, each said handle means includes extension means, and arcuate pivot means mounted on at least one said wall providing a variable pivot point for said extension means.

6. A small component saw assembly according to claim 1 wherein stop means delimits forward pivoting of said shoe means and predetermines the minimum size of lumber passing said saw assemblys.

* * * * *